J. MILLS.
Cultivators.
No. 135,997.                                Patented Feb. 18, 1873.
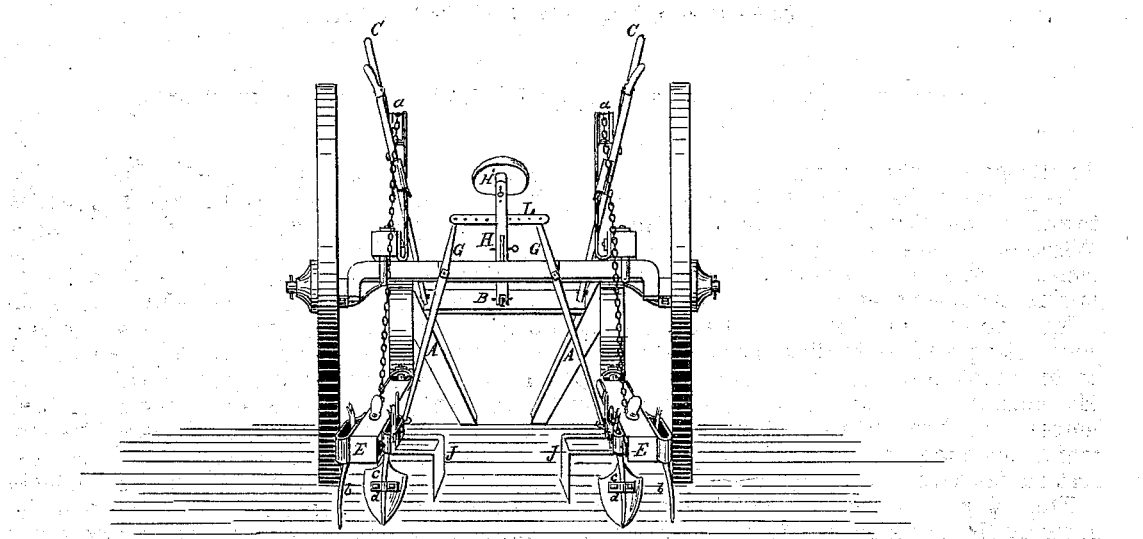
WITNESSES:                                  INVENTOR:

UNITED STATES PATENT OFFICE.

JAMES MILLS, OF JOHNSTOWN, WISCONSIN.

IMPROVEMENT IN CULTIVATORS.

Specification forming part of Letters Patent No. 135,997, dated February 18, 1873.

*To all whom it may concern:*

Be it known that I, JAMES MILLS, of Johnstown, in the county of Rock and State of Wisconsin, have invented certain Improvements in Sulky-Cultivators, of which the following is a specification:

My improvement relates to the spreading, contracting, and controlling the shovel-bars so as to adapt them to wide or narrow rows. My machine is made like a sulky for two horses, with two wheels, and axle and shafts which come together at the forward end and rest on the axle in the ordinary way.

The figure is a rear view of the machine, showing the important parts of my invention, and the attachment by which the shovel-bars are spread or drawn together.

A are the shafts attached to the axle upon the top, and should be of sufficient strength to prevent springing by the power applied when the shovels are working. B is a cross-bar between the shafts, to which the forward end of the lever or bar is attached, upon which the driver is seated. C C are the hand-levers by which the driver is enabled to raise and lower the shovel-bars, to which are attached chains running over pulleys *a a*, the other end of which is attached to the shovel-bars. E E are the shovel-bars running lengthwise of the machine, under the axle, the forward ends attached to cast-iron arms upon the under side of the shafts, projecting downward about one foot on a full-sized machine. This attachment of the shovel-bars to the arms below the shafts is made by means of a knuckle-joint, so that the shovel-bars can be moved freely up or down, or from right to left. The shovel-bars are held a proper distance apart by means of two upright levers, G G, with the fulcrum at the axle, as seen in the drawing, the tops of which are held by a bar, L, perforated with holes to receive the spur upon the upper ends of the levers, so that they can be set further apart or nearer together, at the pleasure of the driver sitting upon the machine. The lower ends of these levers work in slotted plates attached to the shovel-bars, thereby accommodating the machine to wide or narrow rows with great facility. J J are the shields attached to the inside of the shovel-bars by slotted shanks for the purpose of protecting the young plants while working, and can be raised or lowered at pleasure. H is a bar or lever, with its fulcrum at the axle, and the forward end attached to the cross-bar B, upon the rear end of which is a moving seat for the driver, and can be so adjusted as to balance the machine as desired, and accommodated to men of different weights.

What I claim as my invention, and desire to secure by Letters Patent, is—

The combination of the upright levers G G, the lower ends working in slotted plates attached to the shovel-bars E E, with fulcrum at the axle, and adjustable cross-bar L at the top to spread and contract the shovel-bars, substantially as described.

JAMES MILLS.

Witnesses:
F. F. STEVENS,
P. K. DOW.